United States Patent
Furuta et al.

(10) Patent No.: US 12,539,657 B2
(45) Date of Patent: Feb. 3, 2026

(54) RESIN FILM, LAMINATE, AND PACKAGING BODY

(71) Applicant: TOPPAN HOLDINGS INC., Tokyo (JP)

(72) Inventors: Kaoru Furuta, Tokyo (JP); Osamu Tokinoya, Tokyo (JP); Mikinori Yamada, Tokyo (JP)

(73) Assignee: TOPPAN HOLDINGS INC., Tokyo (JP)

(*) Notice: Subject to any disclaimer, the term of this patent is extended or adjusted under 35 U.S.C. 154(b) by 0 days.

(21) Appl. No.: 18/764,974

(22) Filed: Jul. 5, 2024

(65) Prior Publication Data

US 2024/0359385 A1  Oct. 31, 2024

Related U.S. Application Data

(63) Continuation of application No. PCT/JP2022/048491, filed on Dec. 28, 2022.

(51) Int. Cl.
*B29C 48/18* (2019.01)
*B29C 37/00* (2006.01)
(Continued)

(52) U.S. Cl.
CPC .......... *B29C 48/18* (2019.02); *B29C 37/0025* (2013.01); *B29K 2067/003* (2013.01); *B29K 2995/0046* (2013.01); *B29L 2031/712* (2013.01)

(58) Field of Classification Search
CPC ... B29C 48/18; B29C 37/0025; B29C 48/022; B29C 48/21; B29C 48/08; B29K 2067/003; B29K 2995/0046; B29L 2031/712; B32B 7/10; B32B 27/16; B32B 2250/02; B32B 2250/03; B32B 7/12; B32B 15/08; B32B 15/09; B32B 15/20; B32B 27/08; B32B 2255/10; B32B 2255/205; B32B 2255/26; B32B 2255/28; B32B 2272/00; B32B 2307/31; B32B 2307/412; B32B 2307/7244; B32B 2307/7246;
(Continued)

(56) References Cited

U.S. PATENT DOCUMENTS

2019/0126599 A1* 5/2019 Sargeant ................. B32B 27/36
2023/0002131 A1  1/2023 Konishi et al.

FOREIGN PATENT DOCUMENTS

JP  2019-081607 A  5/2019
JP  2019-130774 A  8/2019
(Continued)

OTHER PUBLICATIONS

European Extended Search Report issued in corresponding European Patent Application No. 22918899.0 dated Mar. 12, 2025.
(Continued)

*Primary Examiner* — James C Yager
(74) *Attorney, Agent, or Firm* — Foley & Lardner LLP

(57) ABSTRACT

A resin film is laminated thereon a gas barrier layer having gas barrier properties to constitute a laminate for a packaging body. The resin film contains polyethylene terephthalate. In a cross section of the resin film, the softening temperature of the resin film in the width direction and the softening temperature thereof in the flow direction measured by local thermal analysis are in the range of 200° C. or more and 254° C. or less.

11 Claims, 5 Drawing Sheets

(51) Int. Cl.
*B29K 67/00* (2006.01)
*B29L 31/00* (2006.01)

(58) Field of Classification Search
CPC ........ B32B 2307/7376; B32B 2439/70; B32B 2439/80; B32B 27/36; C08J 7/048; C08J 5/18; C08J 2367/02
See application file for complete search history.

(56) References Cited

FOREIGN PATENT DOCUMENTS

| | | |
|---|---|---|
| JP | 2019-155646 A | 9/2019 |
| JP | 2021-041620 A | 3/2021 |

OTHER PUBLICATIONS

International Searching Authority, "International Search Report," issued in connection with International Patent Application No. PCT/JP2022/048491, dated Mar. 20, 2023.
International Searching Authority, "Written Opinion," issued in connection with International Patent Application No. PCT/JP2022/048491, dated Mar. 20, 2023.

\* cited by examiner

RESIN FILM, LAMINATE, AND PACKAGING BODY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/048491, filed on Dec. 28, 2022, which is based upon and claims the benefit to Japanese Patent Application No. 2022-001495 filed on Jan. 7, 2022, the disclosures of all which are incorporated herein by reference in their entirety.

TECHNICAL FIELD

The present disclosure relates to resin films, laminates provided with resin films, and packaging bodies.

BACKGROUND

Background Art

Resin films containing polyethylene terephthalate are widely used as packaging materials used for forming packaging bodies for packaging objects such as food, pharmaceuticals, and cosmetics. Packaging materials are preferred to have gas barrier properties which are less likely to allow gases, such as oxygen and water vapor, to penetrate therethrough to prevent quality deterioration of the objects. Therefore, laminates that include a transparent film and a barrier layer including a metal film, metal oxide film, or the like are used as packaging materials (e.g., see PTL 1).

CITATION LIST

Patent Literature

PTL 1: JP 2019-81607 A.

SUMMARY OF THE INVENTION

Technical Problem

Gas barrier properties of packaging bodies have been evaluated assuming such situations as production, storage, and usage. However, in distribution processes of commercial products, i.e., packaged objects, external forces causing deformation such as bending and twisting may be repeatedly applied to the commercial products such as when vibration is applied thereto during transportation. To address this, there is a need to provide a packaging material which is able to prevent deterioration in gas barrier properties even when such external forces are applied.

Solution to Problem

A resin film for solving the above issues is laminated thereon a gas barrier layer having gas barrier properties to constitute a laminate for a packaging body. The resin film contains polyethylene terephthalate, and in a cross section of the resin film, a softening temperature of the resin film in a width direction and a softening temperature of the resin film in a flow direction measured by local thermal analysis are in a range of 200° C. or more and 254° C. or less.

A laminate for solving the above issues includes the above resin film and a gas barrier layer having gas barrier properties.

The above packaging body is a packaging body for packaging an object. The packaging body includes the above laminate.

According to the above resin film, the laminate, and the packaging body, even when an external force is applied to the gas barrier layer, the applied external force is easily mitigated by the resin film, and therefore buckling is less likely to occur in the gas barrier layer. Therefore, even when an external force is applied to the laminate including the resin film and the gas barrier layer, separation is less likely to occur between the resin film and the gas barrier layer. For this reason, even when application and release of external force are repeated on the packaging body formed of the laminate such as when the packaging body is transported, defects, which would be induced by separation, are less likely to occur in the gas barrier layer.

In the above resin film, in a loss tangent curve indicating a relationship between loss tangent tan δ of the resin film and temperature, a loss tangent tan δ at a peak position may be 0.160 or more and 0.190 or less.

According to the above resin film, the magnitude of the viscous properties becomes suitable in the resin film relative to the elastic properties, and therefore flexibility is enhanced. Specifically, in the resin film, the proportion of viscosity contribution relative to elasticity contribution in response to external force becomes sufficiently high and thus vibration absorbability is enhanced. Accordingly, even when external forces are repeatedly applied to the laminate, the gas barrier layer laminated on the resin film is prevented from moving to prevent occurrence of defects in the gas barrier layer. Therefore, deterioration in gas barrier properties is prevented in the laminate. Also, the viscous properties of the resin film do not become excessively strong with respect to the elastic properties thereof, and therefore suitability of the laminate as a packaging material is prevented from being deteriorated.

In the above resin film, the temperature at a peak position in the loss tangent curve may be 108° C. or more and 115° C. or less. According to the resin film, the temperature at the peak position is not excessively high, and therefore flexibility of the resin film due to viscosity is likely to be favorably exhibited.

In the above resin film, in a loss elasticity curve indicating a relationship between loss elastic modulus of the resin film and temperature, temperature at a peak position may be 95° C. or more and 102° C. or less, and a loss elastic modulus at the peak position may be 0.30 GPa or more and 0.37 GPa or less.

According to the above resin film, flexibility of the resin film due to viscosity is likely to be favorably exhibited in a low temperature region including temperatures in the environments where the packaging body is used. Therefore, deterioration in gas barrier properties is prevented in the laminate. Also, the viscous properties of the resin film do not become excessively strong, and therefore suitability of the laminate as a packaging material is easily prevented from being deteriorated.

In the above resin film, in a storage elasticity curve indicating a relationship between storage elastic modulus of the resin film and temperature, transition temperature from a glass state to a rubber state may be 80° C. or more and 88° C. or less, and a storage elastic modulus at the transition temperature may be 3.8 GPa or more and 4.1 GPa or less.

According to the resin film, strength of the elastic properties of the resin film becomes suitable for the environments where the packaging body is used. Specifically, the elasticity contribution in response to external force does not become excessively large in the resin film, and therefore gas barrier properties of the laminate are prevented from being deteriorated. On the other hand, the elastic properties of the resin film do not become excessively weak, and therefore suitability of the laminate as a packaging material is easily prevented from being deteriorated.

In the above resin film, the resin film may contain polyethylene terephthalate in dicarboxylic acid units in repeating units, the polyethylene terephthalate containing terephthalic acid and isophthalic acid. According to the resin film, a resin film whose softening temperature is included in the above range can be obtained.

In the above laminate, the gas barrier layer may include a first barrier layer containing at least one of aluminum oxide and silicon oxide; and a second barrier layer containing a polymer compound. According to the laminate, gas barrier properties of the laminate can be enhanced.

In the above laminate, the first barrier layer may be in contact with the resin film; and the second barrier layer may be in contact with the first barrier layer. According to the laminate, the resin film can be protected by the first barrier layer, the first barrier layer can be protected by the second barrier layer, and gas barrier properties of the first barrier layer can be supplemented by the second barrier layer.

In the above laminate, the second barrier layer may contain a silicon compound expressed by $Si(OR^1)_4$ or $R^2Si(OR^3)_3$ ($OR^1$ and $OR^3$ representing hydrolyzable groups, and $R^2$ representing an organic functional group), or one or more hydrolysates of the silicon compound, and a water-soluble polymer with hydroxyl group. Thus, the laminate can enhance the effect of the second barrier layer protecting the first barrier layer and supplementing the gas barrier properties of the first barrier layer.

Advantageous Effects of the Invention

According to the present disclosure, deterioration in gas barrier properties can be prevented in the laminate.

DETAILED DESCRIPTION

Description of the Embodiments

Referring to FIGS. 1 to 11, an embodiment of a resin film, a laminate, and a packaging body will be described.

[Resin Film]

Figure 1:
FIG. 1 is a cross-sectional view illustrating a structure of a resin film according to an embodiment.

Referring to FIG. 1, a resin film 10 will be described.

The resin film 10 shown in FIG. 1 constitutes a laminate for a packaging body with a gas barrier layer having gas barrier properties laminated thereon. The resin film 10 contains polyethylene terephthalate (PET). The PET is at least either of virgin PET newly synthesized from raw materials such as petroleum, and recycled PET. PET products targeted for recycling include used plastic bottles. The recycled PET contained in the resin film 10 is at least either of PET recycled through mechanical recycling and PET recycled through chemical recycling.

In mechanical recycling, PET products are crushed and then the crushed PET products are washed to remove surface dirt and foreign matter. After that, the resin, i.e., the crushed PET products, is exposed to high temperature so that contaminants trapped inside the resin are removed to thereby obtain recycled PET. In chemical recycling, PET products are crushed and then the crushed PET products are washed to remove surface dirt and foreign matter. After that, the resin is restored to an intermediate raw material through depolymerization, and then the intermediate raw material is refined, followed by repolymerization to thereby obtain recycled PET. Mechanical recycling, which does not require large-scale facilities for chemical reactions, can reduce cost for producing recycled PET and can reduce environmental load compared to chemical recycling. From the perspective of reducing cost and environmental load, recycled PET contained in the resin film 10 is preferred to be the PET recycled through mechanical recycling.

In addition to recycled PET, the resin film 10 may contain virgin PET newly synthesized from raw materials such as petroleum. From the perspective of reducing cost and environmental load, the proportion of recycled PET is preferred to be 60% or more and 100% or less relative to the total mass of the resin film 10.

Repeating units constituting PET include diol units and dicarboxylic acid units. In virgin PET, for example, diol units may be ethylene glycol, and dicarboxylic acid units may be terephthalic acid. In recycled PET, for example, diol units may be ethylene glycol, and dicarboxylic acid units may be terephthalic acid and isophthalic acid. Specifically, recycled PET contains terephthalic acid and isophthalic acid as dicarboxylic acid units. The proportion of the isophthalic acid relative to the total dicarboxylic acid units is preferred to be 0.5 mol % or more and 5 mol % or less. The repeating units constituting the PET can include diethylene glycol in the diol units.

In the PET constituting the plastic bottles used for recycling, diol units are ethylene glycol, and dicarboxylic acid units contain terephthalic acid and isophthalic acid. This can prevent crystallization of PET, resultantly improving processability of the materials for plastic bottles. Therefore, dicarboxylic acid units of the recycled PET constituting the resin film 10 contain the dicarboxylic acid units of such plastic bottles, i.e., terephthalic acid and isophthalic acid.

The PET contained in the resin film 10 is preferred to have a weight average molecular weight, for example, of 1,000 or more and 1,000,000 or less. The resin film 10 may contain resins other than PET, and various additives. The additives may, for example, be a plasticizer.

The resin film 10 may be formed of a single layer or multiple layers. If the resin film 10 is formed of multiple layers, the materials constituting the layers may be the same or may be different from each other. In other words, the multiple layers may include layers formed of only a first material. Alternatively, the multiple layers may include layers formed of a first material and layers formed of a second material different from the first material.

If the materials constituting the layers are different from each other, the resin film 10 may be a laminate of layers formed of recycled PET and layers formed of virgin PET. Alternatively, if the materials constituting the layers are different from each other, the resin film 10 may be a laminate including layers containing recycled PET at a first percentage relative to virgin PET, and layers containing recycled PET at a second percentage different from the first percentage relative to virgin PET.

The resin film 10 may be formed of a single material or may be formed of multiple materials. If the resin film 10 is formed of a single material, the resin film 10 may be formed of recycled PET. In this case, the softening temperature of the resin film 10 is determined by the material forming the resin film 10. If the resin film 10 is formed of multiple materials, the multiple materials may be blended or copolymerized in the resin film 10. If the resin film 10 is formed of multiple materials, the resin film 10 may be formed of two or more types of recycled PET, or may be formed of one type or more of recycled PET and virgin PET. If the resin film 10 is formed of multiple materials, the multiple materials may contain materials having a first softening temperature and materials having a second softening temperature different from the first softening temperature.

The thickness of the resin film 10 is selected according to various properties required of a packaging body, such as various environmental resistances, i.e., resistances against heat and moisture, preservability of contents, ease of filling with contents, sealability, and printing suitability including for marking. From the perspective of enhancing processability of the resin film 10, for example, the thickness of the resin film 10 is preferred to be selected from the range of 3 m or more and 100 m or less, and more preferably from the range of 6 m or more and 50 m or less.

For example, an extrusion method can be used for the method of forming the resin film 10. The extrusion method may be a melt extrusion method or a melt coextrusion method. The resin film 10 can be cooled, for example, using any one of cooling roll, air cooling, water cooling, etc. A flow direction of the resin film 10 is the direction in which PET molding progresses when producing the resin film 10. The flow direction may also be referred to as a machine direction (MD) or a vertical direction. The direction orthogonal to the flow direction may also be referred to as a transverse direction (TD) or a horizontal direction. If the resin film 10 is formed of multiple layers, the flow directions of the individual layers are the same.

The resin film 10 may be any of an unstretched film, uniaxially stretched film, and biaxially stretched film. The uniaxially stretched film is a film which is stretched in the MD direction or the TD direction at a predetermined expansion ratio. The biaxially stretched film is a film which is sequentially or simultaneously stretched in the MD direction and the TD direction at a predetermined expansion ratio. If the resin film 10 is formed of multiple layers, the stretching directions of the individual layers are the same.

[Laminate]

Figure 2:
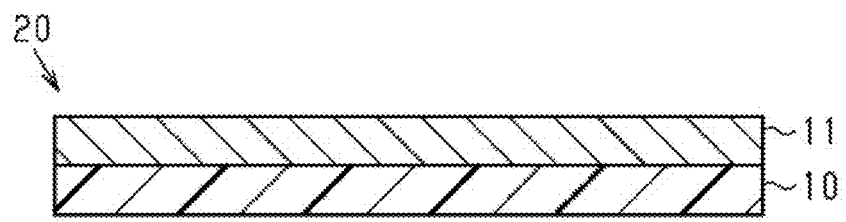
FIG. 2 is a cross-sectional view illustrating a structure of a laminate according to the embodiment.

Referring to FIG. 2, a laminate 20 will be described.

As shown in FIG. 2, the laminate 20 includes the resin film 10 and a gas barrier layer 11. The gas barrier 11 enhances gas barrier properties of the laminate 20.

The gas barrier layer 11 includes a first barrier layer. The first barrier layer is in contact with the resin film 10. The first barrier layer may, for example, be an inorganic oxide film or a metal film. Examples of materials for forming the inorganic oxide film include silicon oxide, aluminum oxide, magnesium oxide, calcium oxide, potassium oxide, tin oxide, sodium oxide, boron oxide, titanium oxide, lead oxide, zirconium oxide, and yttrium oxide. Examples of materials for forming the metal film include aluminum, magnesium, tin, sodium, titanium, lead, zirconium, yttrium, gold, and chromium. The first barrier layer may be made of two or more materials.

A laminate 20 for forming a transparent packaging body includes a first barrier layer made of an inorganic oxide. In particular, a first barrier layer made of aluminum oxide or silicon oxide is preferred. A laminate 20 for forming a packaging body having light-shielding properties includes a first barrier layer made of metal. In particular, a first barrier layer made of aluminum is preferred.

The gas barrier layer 11 may be formed of multiple first barrier layers. In this case, the multiple first barrier layers may be made of the same material, or may include first barrier layers made of a first material, and second barrier layers made of a second material different from the first material.

The thickness of each first barrier layer may be selected according to the material, etc. forming the first barrier layer. The thickness of the first barrier layer may be selected, for example, from a range of 5 nm or more and 300 nm or less. If the first barrier layer has a thickness of 5 nm or more, uniformity of the first barrier layer is enhanced, and the first barrier layer can have a sufficient thickness. Therefore, the first barrier layer can have good gas barrier properties. If the first barrier layer has a thickness of 300 nm or less, the first barrier layer can have good flexibility. Thus, cracking is less likely to occur in the deposited first barrier layer due to external factors such as bending or pulling. From the perspective of enhancing uniformity in the thickness of the gas barrier layer 11, the thickness of the gas barrier layer 11 is more preferred to be in the range of 10 nm or more and 150 nm or less.

Examples of the method of forming the first barrier layer may include vacuum vapor deposition, sputtering, ion plating, and plasma-enhanced chemical vapor deposition (PECVD). From the perspective of increasing productivity of the laminate, the method of forming the first barrier layer is preferred to be vacuum vapor deposition. As a method of heating vapor deposition materials in vacuum vapor deposition, it is preferred that any of electron beam heating, resistive heating, and inductive heating is used. From the perspective of increasing selection flexibility for vapor deposition materials, electron beam heating is preferred to be used. From the perspectives of enhancing adhesion between the first barrier layer and the resin film 10 and enhancing denseness of the first barrier layer, a plasma-assisted method or ion beam-assisted method can be used in vacuum vapor deposition. From the perspective of increasing transparency of the deposited layer, the gas barrier layer 11 may be formed using reactive vapor deposition. In reactive vapor deposition, a reactive gas such as oxygen gas, for example, may be supplied to the deposition space.

From the perspective of enhancing adhesion between the resin film 10 and the first barrier layer, surface treatment, such as plasma treatment or corona treatment, may be applied to the surface of the resin film 10, i.e., the surface on which the first barrier layer is formed. An anchor coat layer may be provided between the resin film 10 and the first barrier layer. The surface treatment and the anchor coat layer can enhance adhesion between the resin film 10 and the deposited layer after heat sterilization, and can enhance barrier properties, etc. of the laminate 20.

The gas barrier layer 11 may include a second barrier layer containing a polymer compound, in addition to or in place of the first barrier layer. If the gas barrier layer 11 includes both the first and second barrier layers, the first barrier layer can be protected by the second barrier layer, and the gas barrier properties of the first barrier layer can be supplemented by the second barrier layer, due to the second barrier layer being in contact with the first barrier layer, or in other words, due to the first and second barrier layers being adjacent to each other. In this case, the first barrier layer is located on the resin film 10, and the second barrier layer is located on the first barrier layer.

The material of the second barrier layer may be appropriately selected according to the purpose of forming the second barrier layer. From the perspectives of the second barrier layer protecting the first barrier layer and supplementing the gas barrier properties of the first barrier layer, the second barrier layer is preferred to contain, for example, a water-soluble polymer and an inorganic compound. The water-soluble polymer may have a hydroxyl group. Examples of the water-soluble polymer may include polyvinyl alcohol, polyvinyl pyrrolidone, starches, methyl cellulose, carboxymethyl cellulose, and sodium alginate. From the perspective of enhancing gas barrier properties of the gas barrier layer 11, the water-soluble polymer is preferred to be polyvinyl alcohol (PVA).

The inorganic compound contained in the second barrier layer may be a silicon compound expressed by, for example, $Si(OR^1)_4$ or $R^2Si(OR^3)_3$, or a hydrolysate of the silicon compound. In the chemical formula expressing the silicon compound, $OR^1$ or $OR^3$ is a hydrolyzable group, and $R^2$ is an organic functional group. The second barrier layer may contain two or more inorganic compounds. Specifically, the second barrier layer may contain two or more silicon compounds, or may contain two or more hydrolysates of the silicon compound, or may contain one or more silicon compounds and one or more hydrolysates of the silicon compound. $Si(OR^1)_4$ may, for example, be tetraethoxysilane $(Si(OC_2H_5)_4)$ (TEOS). TEOS is preferred in that TEOS after hydrolysis is relatively stable in aqueous solvents. $R^2$ contained in $R^2Si(OR^3)_3$ is preferred to be selected from the group consisting of a vinyl group, epoxy group, methacryloxy group, ureido group, and isocyanate group.

The second barrier layer is formed by applying a mixed solution of a solvent, water-soluble polymer, and silicon compound or hydrolysate of the silicon compound to a deposited layer, followed by heating and drying. The solvent may be water, or a mixed solvent of water and an alcohol. When forming the mixed solution, the water-soluble polymer is dissolved in the solvent, first, followed by mixing the silicon compound or the hydrolysate of the silicon compound. The mixed solution may contain an additive to an extent that the gas barrier properties of the second barrier layer formed by using the mixed solution would not be deteriorated. Examples of the additive include isocyanate compounds, silane coupling agents, dispersants, stabilizers, viscosity modifiers, and colorants.

If the water-soluble polymer is PVA, the ratio of the mass of PVA to the mass of the total solid content of the mixed solution is preferred to be 20 mass % or more and 50 mass % or less, or more preferred to be 25 mass % or more and 40 mass % or less. By containing 20 mass % or more of PVA, the second barrier layer can have good flexibility to facilitate formation of the second barrier layer. By containing 50 mass % or less of PVA, the second barrier layer can have good gas barrier properties. The thickness of the second barrier layer may be selected, for example, from the range of 0.05 m or more and 100 m or less.

The gas barrier layer 11 may contain a metal foil or a layer formed of a metal nitride, in addition to the first and second barrier layers, or in place of at least either one of the first and second barrier layers.

The laminate 20 may include a seal layer, an adhesive layer, a decorative layer, etc. in addition to the resin film 10 and the gas barrier layer 11. The seal layer may contain a thermoplastic resin. The seal layer may be melted by heat sealing when a packaging body is formed using the laminate (s) 20. Thus, in two laminates 20, the edge of a first laminate may be fused to the edge of a second laminate 20. Alternatively, in a single laminate 20, a first part of the laminate 20 may be fused to a second part thereof. The adhesive layer may enhance adhesion between the gas barrier layer 11 and an upper layer above the gas barrier layer 11, or adhesion between the gas barrier layer 11 and a lower layer under the gas barrier layer 11. The decorative layer may display decoration, information, etc. formed by printing.

The thickness of the laminate 20 may be selected according to various resistances required of the packaging body formed using the laminate 20, and processability required of the laminate 20. The thickness of the laminate 20 may, for example, be 30 m or more and 300 m or less.

Examples of the method used for forming the laminate 20 may include the deposition methods mentioned above, various coating methods, dry lamination methods, and extrusion lamination methods.

[Packaging Body]

Figure 3:
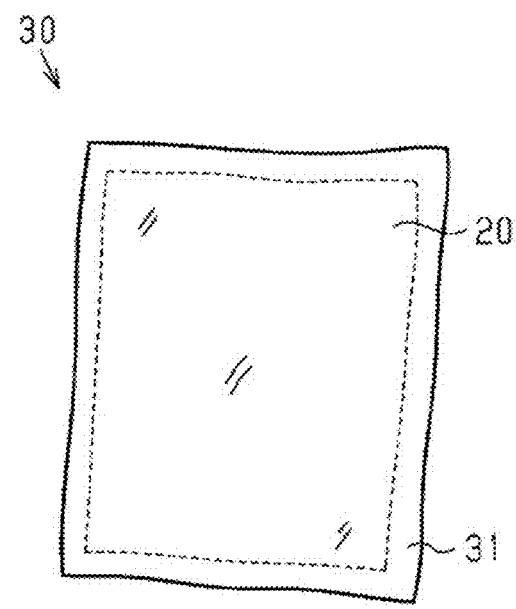
FIG. 3 is a perspective view illustrating a structure of a packaging body according to the embodiment.

Referring to FIG. 3, a packaging body will be described.

A packaging body 30 shown in FIG. 3 is formed of laminates 20. The packaging body 30 defines a space on the inside thereof where an object to be packaged can be accommodated. In the example shown in FIG. 3, the packaging body 30 has a bag shape. In the packaging body 30, the edges of the laminates 20 forming the packaging body 30 are bonded to each other throughout the periphery to seal the packaging body 30. In the packaging body 30, the gas barrier layers 11 are located on the inside with respect to the resin films 10. The shape and size of the packaging body 30 are not specifically limited. The shape and size of the packaging body 30 may be designed according to the shape and size of the object to be packaged. Examples of the object to be packaged may include food, pharmaceuticals, and cosmetics.

The method of bonding the edges of the laminates 20 is not specifically limited. For example, the edges of the laminates 20 may be bonded to each other by heat sealing as mentioned above, or may be bonded using other methods. In the example shown in FIG. 3, the packaging body 30 has a sealing part 31. In the two laminates 20, the sealing part 31 is a part where the edge of a first laminate 20 has been bonded to the edge of a second laminate 20.

The packaging material for forming the packaging body 30 includes the laminate 20 described above and a sealant layer. The sealant layer is laminated on the gas barrier layer 11 in the laminate 20. Examples of the material for forming the sealant layer may include polyolefin resins and polyester resins. The thickness of the sealant layer can be appropriately changed according to the purpose of using the packaging material. The sealant layer may have a thickness, for example, of 15 m or more and 200 m or less.

In the laminate 20, the sealant layer may be laminated on the resin film 10. In this case, in the packaging body 30, the gas barrier layer 11 may be located on the outside of the resin film 10.

An adhesive layer may be located between the gas barrier layer 11 and the sealant layer, or between the resin film 10 and the sealant layer. This can enhance adhesion between the sealant layer and the layer adjacent to the sealant layer. The adhesive layer may be made of a one- or two-pack curing type urethane adhesive, or the like.

The packaging body 30 is not limited to have the bag shape shown in FIG. 3, but may, for example, have a tubular shape, or a bag shape in which a first tubular end is sealed and a second tubular end is open.

[Softening Temperature of Resin Film]

The resin film 10 of the present disclosure satisfies the following Condition 1.

(Condition 1) In a cross section of the resin film 10, the softening temperature of the resin film 10 in the width direction (TD direction) and the softening temperature thereof in the flow direction (MD direction) measured by local thermal analysis are in the range of 200° C. or more and 254° C. or less.

The softening temperature refers to the temperature at which a substance such as a resin exhibits a softening behavior. The softening temperatures in a cross section of the resin film 10 of the present disclosure are evaluated by local thermal analysis (LTA) using an atomic force microscope. In local thermal analysis, a cross section of the resin film 10 is heated by applying a voltage to a cantilever having a heater.

In local thermal analysis, first, the shape of a cross section of the resin film 10 is measured. Next, a cantilever is brought into contact with the cross section at a predetermined position thereof to apply a predetermined force thereto and voltage application is started to the heater. Then, the voltage applied to the heater is gradually increased to heat the cross section, while maintaining the magnitude of the force applied to the cross section by the cantilever. The magnitude of the voltage applied to the heater at the point when the height change of the cantilever orthogonal to the cross section has changed from increase to decrease is converted to temperature, so that the local softening temperature in the vicinity of the cross section of the resin film 10 can be obtained. In the resin film 10 before softening, the height of the cantilever in the orthogonal direction increases due to thermal expansion occurring in the cross section. However, when the resin film 10 is softened, the height of the cantilever in the orthogonal direction decreases even if the magnitude of the force applied to the cross section is constant. Therefore, the temperature converted from the voltage applied when the height of the cantilever in the orthogonal direction is maximum is the softening temperature in the cross section of the resin film 10.

In the cross section of the resin film 10, when measuring the softening temperature in the TD direction, the resin film 10 is mounted on the atomic force microscope such that the TD direction in the resin film 10 will be parallel to the direction in which the height of the cantilever changes, i.e., the orthogonal direction. In contrast to this, in the cross section of the resin film 10, when measuring the softening temperature in the MD direction, the resin film 10 is mounted on the atomic force microscope such that the MD direction in the resin film 10 will be parallel to the direction in which the height of the cantilever changes, i.e., the orthogonal direction.

According to the resin film 10 satisfying Condition 1, i.e., the resin film 10 whose softening temperatures in both the TD and MD directions are in the above range, the resin film 10 is easily softened compared to the case where the resin film has softening temperatures exceeding the upper limit of Condition 1. Therefore, even when an external force is applied to the gas barrier layer 11, the applied external force is easily mitigated by the resin film 10, and therefore buckling is less likely to occur in the gas barrier layer 11.

Therefore, even when an external force is applied to the laminate 20 including the resin film 10 and gas barrier layer 11, separation is less likely to occur between the resin film 10 and the gas barrier layer 11. For this reason, even when application and release of external force are repeated on the packaging body 30 formed of the laminate 20 such as when the packaging body 30 is transported, defects, which would be caused by separation, are less likely to occur in the gas barrier layer 11. Specifically, due to increased adhesion of the gas barrier layer 11 to the resin film 10, if an external force is applied to the packaging body 30, the gas barrier layer 11 moves in conformity with the resin film 10, so that the external force applied to the gas barrier layer 11 is easily mitigated by the resin film 10. Therefore, defects are less likely to occur in the gas barrier layer 11.

Furthermore, for example, in the case of forming the first barrier layer by vacuum vapor deposition or the like, the first barrier layer is formed, when forming the laminate 20, so as to be in contact with one surface of the resin film 10. As mentioned above, the first gas barrier layer is formed by vacuum vapor deposition, sputtering, ion plating, plasma-enhanced chemical vapor deposition (PECVD), or the like. When forming the first barrier layer, energy is supplied to the resin film 10 by the deposition species coming into contact with the resin film 10, and therefore the temperature of the resin film 10 increases.

For example, in the case of forming the first barrier layer by vacuum vapor deposition, the first barrier layer formed of the deposited particles is more likely to encounter the bonding site of the plastic film 10, so that adhesion of the first barrier layer to the resin film 10 is increased.

In the case of using the packaging body 30 for packaging food, the packaging body 30 is subjected to retort sterilization for the purpose of prolonging the storage life of the food contained in the packaging body 30. If the resin film 10 satisfies Condition 1 mentioned above, adhesion of the first barrier layer to the resin film 10 can be increased to an extent of preventing occurrence of cracking in the first barrier layer, even when the packaging body 30 shrinks due to retort sterilization. Accordingly, cracking is prevented from occurring during retort sterilization, which prevents deterioration in barrier properties of the gas barrier layer 11. Since cracking is prevented from occurring in the first barrier layer during retort sterilization, cracking is prevented from expanding due to repeated application and release of external force on the packaging body 30 such as when the packaging body 30 is transported, thereby preventing deterioration in barrier properties of the gas barrier layer 11.

If the softening temperatures in the TD and MD directions in the resin film 10 are the lower limit or more, the resin film 10 is prevented from becoming excessively soft during deposition of the first barrier layer. Therefore, deformation to an extent of deteriorating the barrier properties of the gas barrier layer 11 can be prevented from occurring in the resin film 10, thereby preventing occurrence of deformation in the gas barrier layer 11. In the case of using the packaging body 30 for storing food, the resin film 10 can be prevented from being excessively deformed during retort sterilization. Therefore, during retort sterilization, the gas barrier layer 11 can be prevented from suffering from deformation to an extent of deteriorating the gas barrier properties of the gas barrier layer 11. Specifically, if the softening temperatures are the lower limit or more in the TD and MD directions in the resin film 10, the resin film 10 can have high heat resistance to an extent not deteriorating suitability of the laminate 20 as a packaging material.

If both of the softening temperatures in the TD and MD directions in the resin film 10 are the upper limit or less of Condition 1, rigidity of the resin film 10 is reduced. Therefore, stress caused in the laminate 20 is likely to be mitigated during lamination of the laminate 20 including the resin film 10, compared to the case where at least either one of the softening temperatures in the TD and MD directions exceeds the upper limit of Condition 1 in the resin film 10. Thus, defects can be prevented from occurring in the gas barrier layer 11.

From the perspective of enhancing aesthetic properties of the packaging body 30, the softening temperatures in the TD and MD directions in the resin film 10 are preferred to be 220° C. or more. Specifically, in the resin film 10, the softening temperatures in the TD and MD directions are preferred to be 220° C. or more and 254° or less. Thus, in all dicarboxylic acid units, the proportion of isophthalic acid with low regularity of alignment is prevented from becoming excessively high, and therefore scattering of incident light is prevented in the resin film 10. Therefore, yellowing of the resin film 10 is prevented.

From the perspective of further preventing deformation of the resin film 10 when forming the first barrier layer, the softening temperatures in the TD and MD directions in the resin film 10 are preferred to be 240° C. or more. Specifically, in the resin film 10, the softening temperatures in the TD and MD directions are preferred to be 240° C. or more and 254° or less.

In the resin film 10, the softening temperatures in the TD and MD directions can be adjusted such as by the proportion of isophthalic acid relative to all dicarboxylic acid units of the resin film 10. For example, if the softening temperatures in the TD and MD directions in the resin film 10 are required to be reduced, the proportion of isophthalic acid relative to all dicarboxylic acid units of the resin film 10 may be increased to adjust the softening temperatures in the TD and MD directions in the resin film 10.

Also, for example, if the softening temperatures in the TD and MD directions are required to be increased, the cooling temperature when producing the resin film 10 may be reduced to perform adjustment. If the softening temperatures in the TD and MD directions are required to be reduced, the cooling rate when producing the resin film 10 may be increased to grow crystals moderately while leaving amorphous domains, for adjustment of the softening temperatures. If the softening temperatures in the TD and MD directions are required to be reduced, the stretching ratio when producing the resin film 10 may be reduced to prevent molecular alignment, for adjustment of the softening temperatures.

[Viscoelastic Properties of Resin Film]

If deterioration in barrier properties is further required to be prevented, the resin film 10 is preferred to satisfy the following Condition 2 in a storage elasticity curve showing the relationship between storage elastic modulus G1 and temperature. The resin film 10 is preferred to satisfy the following Condition 3 in a loss elasticity curve showing the relationship between loss elastic modulus G2 and temperature. The resin film 10 is preferred to satisfy the following Condition 4 in a loss tangent curve of resin film 10 showing the relationship between loss tangent tan δ and temperature.

(Condition 2) Transition temperature T1 from a glass state to a rubber state is 80° C. or more and 88° C. or less, and the storage elastic modulus G1 in the transition temperature T1 is 3.8 GPa or more and 4.1 GPa or less.

(Condition 3) A temperature T2 at the peak position is 95° C. or more and 102° C. or less, and the loss elastic modulus G2 at the peak position is 0.30 GPa or more and 0.37 GPa or less.

(Condition 4) A loss tangent tan δ at a temperature T3 of the peak position is 0.160 or more and 0.190 or less.

The storage elastic modulus G1 of the resin film 10 indicates the components of energy generated in an object by an external force and stored inside the object. The loss elastic modulus G2 of the resin film 10 indicates the components of energy generated in an object by an external force and diffused externally as heat. Specifically, the magnitude of the storage elastic modulus G1 indicates the degree of elasticity, and the magnitude of the loss elastic modulus G2 indicates the degree of viscosity. The loss tangent tan δ indicates the ratio of the loss elastic modulus G2 to the storage elastic modulus G1 (G2/G1), i.e., a balance between elasticity and viscosity in the resin film 10.

The higher the elasticity in the resin film 10, the higher the responsiveness in the resin film 10 to change in shape in response to application and release of external force. Specifically, if application and release of external force are repeated in a short time on the resin film 10 as in the case where vibration is applied to the resin film 10, generation of strain due to application of external force and recovery from strain due to release of external force are repeated in a short time in the resin film 10. Therefore, the relative movement of the gas barrier layer 11 following the resin film 10 becomes larger. Consequently, defects such as pinholes are likely to be caused in the gas barrier layer 11, and therefore gas barrier properties of the laminate 20 are likely to be deteriorated.

In other words, the lower the elasticity in the resin film 10, the lower the responsiveness in the resin film 10 to change in shape in response to application and release of external force. Specifically, the relative movement of the gas barrier layer 11 following the resin film 10 becomes smaller, by which the gas barrier properties of the laminate 20 are prevented from being deteriorated.

The lower the viscosity in the resin film 10, the slower the deformation progresses in response to the application of external force, and the more difficult it is for the deformation to recover even when the external force is released. Therefore, even when application and release of external force on the resin film 10 are repeated in a short time, the resin film 10 and the gas barrier layer 11 are prevented from moving. In other words, vibration absorbability of the laminate 20 is enhanced. Accordingly, occurrence of defects is prevented in the gas barrier layer 11 to thereby prevent deterioration in gas barrier properties of the laminate 20. However, if viscosity is excessively high in the resin film 10, processability of the laminate 20 is deteriorated and the strength of the laminate 20 is deteriorated.

As mentioned above, the resin film 10 is preferred to satisfy Condition 2. In many cases, the temperature of the environment where the packaging body 30 is used is lower than the transition temperature T1, i.e., the resin film 10 is used in a glass state with low fluidity. Since change in the storage elastic modulus G1 is small when the resin film 10 is in a glass state, elasticity of the resin film 10 when used as the packaging body 30 can be appropriately evaluated by evaluating the storage elastic modulus G1 at the transition temperature T1.

According to the resin film 10 satisfying the upper limit of the storage elastic modulus G1 of Condition 2, an elasticity contribution in response to external force does not become excessively large in the resin film 10, and therefore deterioration in gas barrier properties of the laminate 20 is prevented. According to the resin film 10 satisfying the lower limit of the storage elastic modulus G1 of Condition 2, elasticity of the resin film 10 is not excessively low, and therefore deterioration in suitability of the laminate 20 as a packaging material is prevented.

The resin film 10 is preferred to satisfy Condition 3. The temperature T2 at the peak position of the loss elasticity curve is the temperature at which viscosity of the resin film 10 is prominently exhibited. The higher the temperature T2 at the peak position, the more difficult it tends to be to exhibit flexibility due to viscosity in the low temperature region including the temperatures of the environments where the packaging body 30 is used. According to the resin film 10 satisfying the lower limit of the loss elastic modulus G2 of Condition 3, flexibility due to viscosity is likely to be favorably exhibited in the low temperature region. Therefore, deterioration in gas barrier properties of the laminate 20 is prevented. According to the resin film 10 satisfying the upper limit of the loss elastic modulus G2 of Condition 3, deterioration in suitability of the laminate 20 as a packaging material is prevented.

The resin film 10 is preferred to satisfy Condition 4. Since the loss tangent tan δ is the ratio between the storage elastic modulus G1 and the loss elastic modulus G2, the influence of the factors of each sample of the resin film 10 causing errors in the dynamic elastic modulus can be removed. Specifically, there is only a small variation in curve shape between the samples having the same configuration. Therefore, the loss tangent tan δ can be used for accurately evaluating the dynamic elastic modulus.

The higher the loss tangent tan δ, the higher the viscous properties of the resin film 10 with respect to the elastic properties thereof, i.e., the higher the vibration absorbability. According to the resin film 10 satisfying the lower limit of the loss tangent tan δ of Condition 4, the proportion of the viscosity contribution relative to the proportion of elasticity contribution in response to external force becomes sufficiently high, and therefore deterioration in gas barrier properties of the laminate 20 is prevented. However, according to the resin film 10 satisfying the upper limit of the loss tangent tan δ of Condition 4, the viscous properties of the resin film 10 do not become excessively strong with respect to the elastic properties, and therefore deterioration in suitability of the laminate 20 as a packaging material is prevented. The temperature T3 at the peak position may be 108° C. or more and 115° C. or less. If the temperature T3 at the peak position is 115° C. or less, flexibility of the resin film 10 due to viscosity is likely to be favorably exhibited in the low temperature region including the temperatures of the environments where the packaging body 30 is used.

The transition temperature T1 from a glass state to a rubber state, the temperature T2 at the peak position of the loss elasticity curve, the storage elastic modulus G1, the loss elastic modulus G2 at the peak position of the loss elasticity curve, and the loss tangent tan δ at the peak position of the loss tangent curve can be adjusted such as by adjusting the proportion of isophthalic acid relative to all dicarboxylic acid units of the resin film 10.

For example, if the resin film 10 is required to have increased viscosity, the proportion of isophthalic acid relative to all dicarboxylic units of the resin film 10 may be increased to adjust viscosity of the resin film 10. If the storage elastic modulus G1 is required to be reduced or if the loss tangent tan δ is required to be increased, the cooling temperature when producing the resin film 10 may be reduced, by which the storage elastic modulus G1 and the loss tangent tan δ can be adjusted. If the loss tangent tan δ is required to be increased or if the loss elastic modulus G2 is required to be increased, the cooling rate when producing the resin film 10 may be increased, by which crystals can be grown moderately while leaving amorphous domains, thereby adjusting the loss tangent tan δ and the loss elastic modulus G2. If the transition temperature T1 from a glass state to a rubber state is required to be reduced or if the storage elastic modulus G1 is required to be reduced, the stretching ratio when producing the resin film 10 may be reduced to prevent molecular alignment, by which the transition temperature T1 and the storage elastic modulus G1 can be adjusted.

Examples

Referring to FIGS. 4 to 11 and Tables 1 to 3, examples and comparative examples will be described.

Example 1

Three resin layers were laminated with each other by coextrusion to form a resin film 10 of Example 1 with a thickness of 12 m. In this case, three resin layers having the same composition were formed from virgin PET and recycled PET reproduced by mechanical recycling. In the resin film 10 of Example 1, the mass of the recycled PET was set to 80% relative to the total mass of the resin film, and the mass of the virgin PET was set to 20% relative to the total mass of the resin film.

Example 2

Three resin layers were laminated with each other so that a second resin layer was sandwiched between two first resin layers to form a resin film 10 of Example 2 with a thickness of 12 m. In this case, the first resin layers were formed from recycled PET reproduced by chemical recycling. The second resin layer was formed by mixing recycled PET reproduced by chemical recycling, with recycled PET reproduced by mechanical recycling. In the second resin layer, the mass of the recycled PET reproduced by mechanical recycling was set to 80% relative to the total mass of the second resin layer, and the mass of the recycled PET reproduced by chemical recycling was set to 20% relative to the total mass of the second resin layer. In the resin film of Example 2, the mass of the recycled PETs was set to 100% relative to the total mass of the resin film 10.

Example 3

Three resin layers were laminated with each other so that a second resin layer was sandwiched between two first resin layers to form a resin film 10 of Example 3 with a thickness of 12 m. In this case, the first resin layers were formed from virgin PET. The second resin layer was formed from recycled PET produced by chemical recycling. In the resin film of Example 3, the mass of the recycled PETs was set to 70% relative to the total mass of the resin film 10.

Example 4

A resin obtained by kneading first recycled PET reproduced by mechanical recycling and second recycled PET reproduced by chemical recycling was extruded to form a resin film of Example 4 constituted of a single layer with a thickness of 12 m. In the second recycled PET, the proportion of isophthalic acid relative to all dicarboxylic units was higher than in the first recycled PET. In the resin film of Example 4, the mass of the first recycled PET was set to 50 mass % relative to the total mass of the resin film 10, and the mass of the second recycled PET was set to 50 mass % relative to the total mass of the resin film 10.

Example 5

A resin obtained by kneading first recycled PET reproduced by mechanical recycling and second recycled PET reproduced by chemical recycling was extruded to form a resin film of Example 5 constituted of a single layer with a thickness of 12 m. In the second recycled PET, the proportion of isophthalic acid relative to all dicarboxylic units was higher than in the first recycled PET. In the resin film of Example 5, the mass of the first recycled PET was set to 50 mass % relative to the total mass of the resin film 10, and the mass of the second recycled PET was set to 50 mass % relative to the total mass of the resin film 10.

Comparative Example 1

A single layer was formed using virgin PET to obtain a resin film 10 of Comparative Example 1 with a thickness of 12 m. In the resin film 10 of Comparative Example 1, the mass of recycled PET was set to 0 mass % relative to the total mass of the resin film.

Example 6

A first barrier layer made of aluminum oxide with a thickness of 10 nm was laminated on the resin film 10 of Example 1 by vacuum vapor deposition. A second barrier layer with a thickness of 300 nm was formed on the first barrier layer by gravure coating. In this case, a first solution was prepared by adding hydrochloric acid to tetraethoxysilane, followed by stirring the mixture for 30 minutes for hydrolyzation of the tetraethoxysilane, and a second solution was prepared by mixing water with isopropyl alcohol and dissolving polyvinyl alcohol in the mixed solution. Then, 60 parts by mass of the first solution was mixed with 40 parts by mass of the second solution to prepare a coating agent. The coating agent was applied to the first barrier layer using a bar coater, followed by drying for 1 minute at 120° C. using a dryer to form a second barrier layer. Thus, a laminate of Example 6 was obtained, including a resin film 10 and a gas barrier layer 11 including the first and second barrier layers.

Comparative Example 2

A laminate of Comparative Example 2 was obtained using the same materials and method as in Example 6, except that the resin film 10 of Example 1 was changed to the resin film of Comparative Example 1. Thus, a laminate of Comparative Example 2 was obtained, including the resin film of Comparative Example 1 and a gas barrier layer 11 including the first and second barrier layers.

[Evaluation Method]
[Softening Temperature]

When measuring softening temperatures in the TD and MD directions in each resin film 10, corona treatment was performed first on the front and rear surfaces of the resin film 10. For corona treatment, a corona treatment machine (CT-0212 manufactured by Kasuga Denki, Inc.) was used, and power input to the corona treatment machine was set to 0.20 kW.

Next, each resin film 10 was cut into a strip using a razor so as to have a short-side length of 1.0 mm and a long-side length of 5.0 mm as viewed perpendicularly to the front surface of the resin film 10 to obtain a film strip. When preparing a film strip for measuring the softening temperature in the TD direction, each resin film 10 was cut such that the long side would be parallel to the TD direction, and when preparing a film strip for measuring the softening temperature in the MD direction, each resin film 10 was cut such that the long side would be parallel to the MD direction. After embedding each resin film 10 in a photocurable resin (D-800 manufactured by Toagosei Co., Ltd.), the photocurable resin was cured using a halogen lamp (KTX-100R manufactured by Kenko Tokina Corporation) to obtain a test specimen.

The resin-embedded test specimen was fixed with the insert for specimen holder of an atomic force microscope (AFM). When preparing a cross section for measuring softening temperature, an ultra-microtome (EM UC7 manufactured by Leica Microsystems AG) on which a glass or diamond knife could be mounted was used. First, at 25° C., the cross section of the film strip was cut using the ultra-microtome mounting a glass knife, i.e., the cross section that was part of the side surface connecting between the front and rear surfaces of the resin film 10, including the thickness direction of the resin film 10, and extending parallel to the short side of the film strip. Next, using the ultra-microtome mounting a diamond knife, the cross section of the film strip was further cut until the cross section after cutting became a mirror surface, thereby obtaining a cross section of the resin film 10. In this case, the cutting speed was set to 1.0 mm/s, and the cutting thickness was set to 100 nm. The direction of cutting the cross section using the glass and diamond knives was set to the direction orthogonal to the thickness direction of the resin film 10. In this way, the processing of preparing a cross section for measuring softening temperature of each of the films 10 of the examples and the comparative examples was performed in an environment of 25° C., i.e., room temperature.

In the mirror surface of each test specimen, softening temperature was measured at a ½ position in the thickness of the resin film 10, i.e., at the center position in the thickness direction of the resin film 10. Softening temperature at the cross section of each resin film 10 was measured using the method described below.

The shape and softening temperature of the cross section were measured using an atomic force microscope (AFM) (MFP-3D-SA manufactured by Oxford Instruments) and a Ztherm system (manufactured by Oxford Instruments), i.e., a local thermal analysis option. Also, the shape and softening temperature of the cross section were measured using a cantilever (AN2-200 manufactured by Anasys Instruments Corp.) whose spring constant was 0.5 N/m or more and 3.5 N/m or less. In the Ztherm system, the shape was measured using an AC mode (tapping mode) and the softening temperature was measured using a contact mode. In each cross section, softening temperatures were measured in two fields of view, and specifically, softening temperatures were measured at 10 positions in each field of view. An average value of the obtained softening temperatures was calculated as a softening temperature in each direction in each resin film 10.

When measuring the softening temperatures, the cantilever contact pressure, i.e., the amount of change in cantilever deflection, was set to 0.2 V, the voltage application rate, i.e., the temperature rise rate, was set to 0.5 V/sec., and the maximum application voltage was set to 6.0 V. Then, in the Ztherm system, using the detrending correction function for acquiring change in cantilever deflection with respect to the applied voltage, the maximum voltage was applied to the cantilever in a state in which the cantilever was not in contact with the cross section of the resin film 10 to perform detrending correction.

Next, the cantilever was brought into contact with the cross section of the resin film 10 to thereby heat the cross section of the resin film 10. When the height change of the cantilever orthogonal to the cross section changed from rising to falling, and then, when the cantilever moved down by 50 nm from the height at the point when the height change thereof had changed from rising to falling, softening temperature measurement was ended. If the voltage applied to the cantilever reached the maximum before the cantilever moved down by 50 nm from the height at the point when the height change thereof had changed from rising to falling, the maximum applied voltage during detrending correction and measurement was raised by 0.5 V to again measure the softening temperature.

The point when the position change of the cantilever had changed from rising to falling, i.e., the point when the height of the cantilever in the orthogonal direction was maximum, was set to the point when the cross section of the specimen had softened, and the voltage applied to the cantilever then was read. When measuring the softening temperature in the TD direction, the measurement was performed in a state in which the TD direction of the resin film 10 was parallel to the direction in which the height of the cantilever changed. When measuring the softening temperature in the MD direction, the measurement was performed in a state in which the MD direction of the resin film 10 was parallel to the direction in which the height of the cantilever changed.

In order to convert the voltage applied to the heater at the point when the cross section of the resin film 10 softened, to a softening temperature, calibration curves were calculated using calibration samples whose melting points, i.e., melting peak temperatures, had been measured using a differential scanning calorimeter (DSC). For the calibration samples, a polycaprolactone pellet, low density polyethylene pellet, polypropylene pellet, and biaxially stretched polyethylene terephthalate film were used. The melting point of the polycaprolactone pellet was 60° C., that of the low density polyethylene pellet was 112° C., that of the polypropylene pellet was 166° C., and that of the biaxially stretched polyethylene terephthalate film was 255° C.

Processing similar to that used for preparing a cross section for measuring softening temperature of each resin film 10 was used in an environment of glass transition temperature or lower of each calibration sample, when preparing a cross section for measuring softening temperature. Processing for preparing a cross section of the polycaprolactone pellet was performed in an environment of −80° C., processing for preparing a cross section of the low density polyethylene pellet was performed in an environment or −140° C., and processing for preparing a cross section of the polypropylene pellet was performed in an environment of −40° C. In contrast, processing for preparing a cross section of the biaxially stretched polyethylene terephthalate film was performed in an environment of 25° C., i.e., room temperature.

When obtaining measurement curves for the calibration samples, the maximum applied voltage during detrending correction was set to 3.5 V for the polycaprolactone, 5.5 V for the low density polyethylene, 6.7 V for the polypropylene, and 7.9 V for the polyethylene terephthalate. The cantilever contact pressure, i.e., the amount of change in cantilever deflection, was set to 0.2 V, and the voltage application rate, i.e., the temperature rise rate, was set to 0.5 V/sec.

After obtaining measurement curves at 20 different points in the cross section of each calibration sample, the average value of the applied voltage and melting point at the point when the calibration sample softened were approximated by a cubic function using the least squares method to obtain a calibration curve.

Figure 4:
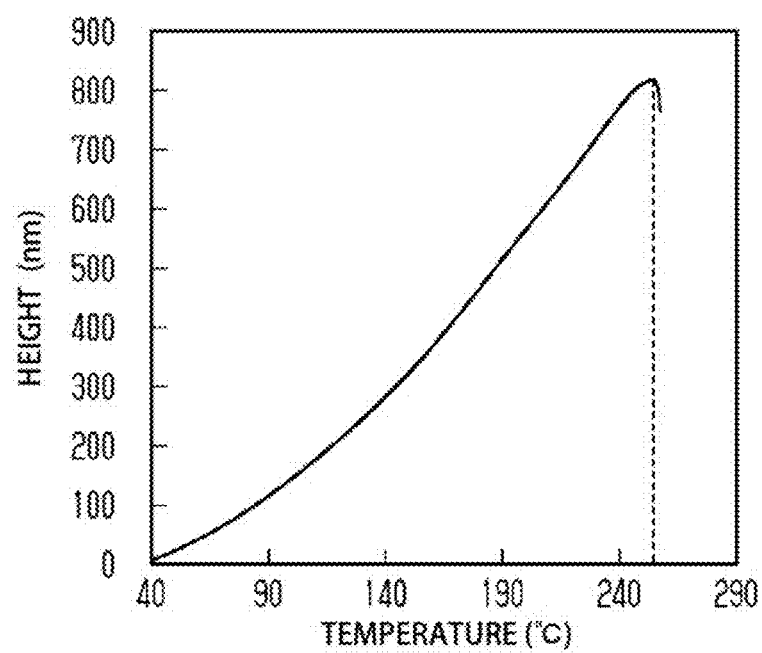
FIG. 4 is a graph showing the relationship between height of a cantilever and temperature according to Example 1.
Figure 5:
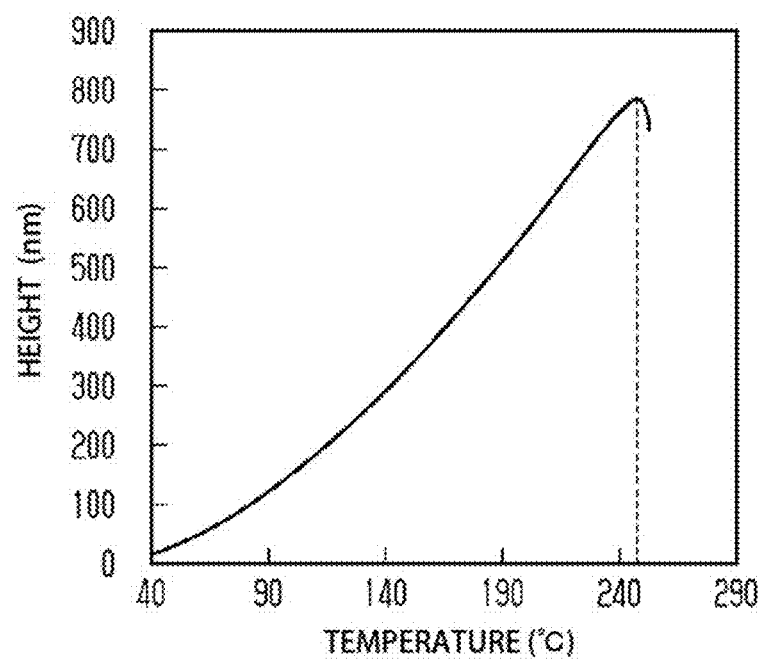
FIG. 5 is a graph showing the relationship between height of a cantilever and temperature according to Example 2.
Figure 6:
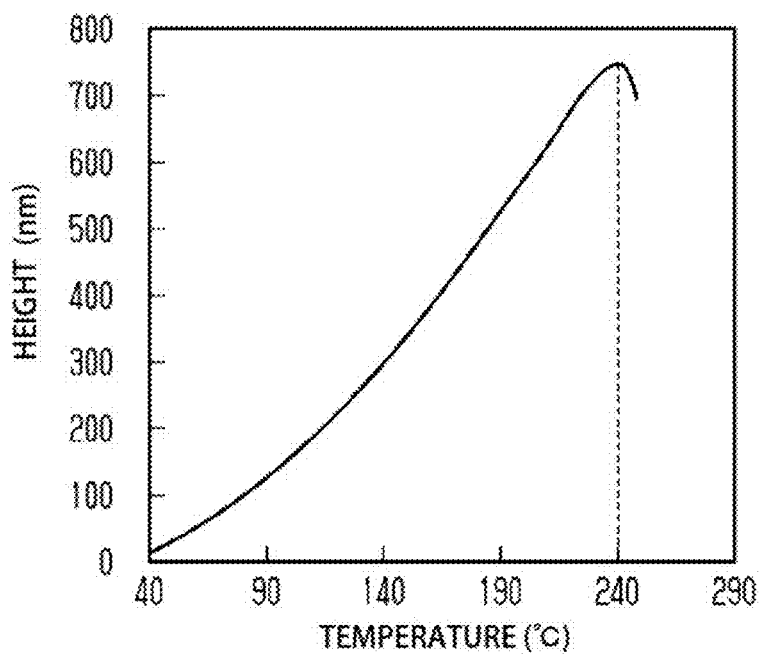
FIG. 6 is a graph showing the relationship between height of a cantilever and temperature according to Example 3.
Figure 7:
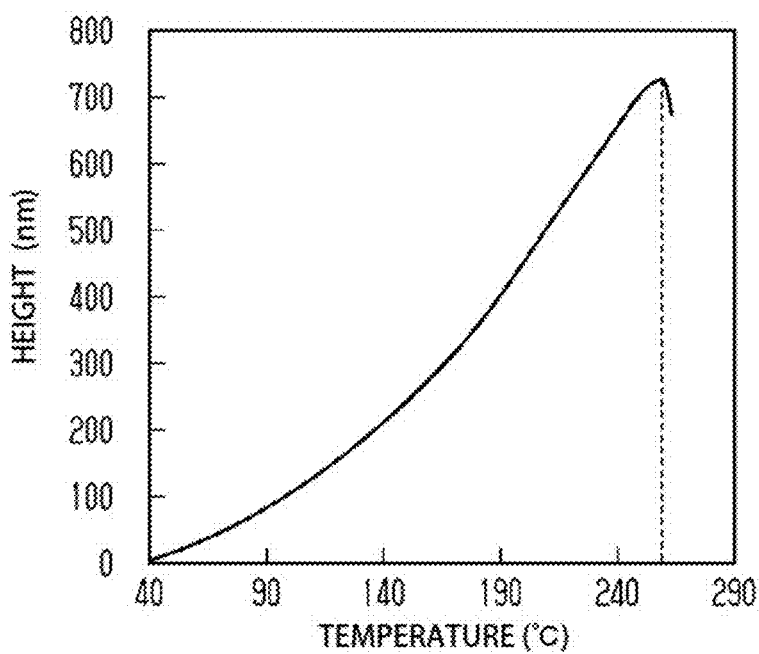
FIG. 7 is a graph showing the relationship between height of a cantilever and temperature according to Comparative Example 1.

The applied voltage at the point when each resin film 10 softened was converted to temperature using the calibration curves to calculate the softening temperature of the resin film 10. FIG. 4 is a graph in which applied voltage is converted to temperature, for an example of the measurement curve showing the relationship between height of the cantilever and applied voltage obtained in Example 1. FIG. 5 is a graph in which applied voltage is converted to temperature, for an example of the measurement curve obtained in Example 2. FIG. 6 is a graph in which applied voltage is converted to temperature, for an example of the measurement curve obtained in Example 3. FIG. 7 is a graph in which applied voltage is converted to temperature, for an example of the measurement curve obtained in Comparative Example 1.

[Dynamic Elastic Modulus]

Test specimen strips were prepared from the respective resin films of Examples 1 to 5 and Comparative Example 1. In this case, the length of each test specimen was set to 20 mm and the width thereof was set to 10 mm. The flow direction (MD direction) when forming the resin film was set to the length direction of the test specimen. Using a thermo-mechanical analyzer (DMA7100 manufactured by Hitachi High-Tech Corporation), a storage elastic modulus G1 and a loss elastic modulus G2 were measured for each test specimen to calculate a loss tangent tan δ. The storage elastic modulus G1 and the loss elastic modulus G2 were measured under the conditions shown below.

Frequency: 10 Hz
Tension conditions: Strain amplitude 10 m
  : Minimum tension/Compression force 50 mN
  : Tension/Compression force gain 1.2
  : Initial force amplitude 50 mN
Heating conditions: Temperature rise rate 2° C./min
  : Heating temperature 30° C. or more and 180° C. or less

[Gas Barrier Properties]

Two test specimens were prepared from each of the laminate of Example 6 and the laminate of Comparative Example 2 to evaluate gas barrier properties before and after Gelbo Flex testing. Gelbo Flex testing, measurement of oxygen permeability, and measurement of water vapor permeability were performed under the conditions shown below.

[Gelbo Flex Testing]

Gelbo Flex testing was performed for each test specimen using a flexibility evaluation device (Gelbo Flex Tester manufactured by Tester Sangyo Co., Ltd.). In this case, each test specimen was mounted on the fixing head of the flexibility evaluation device so as to have a tubular shape. Specifically, both ends of each test specimen were held by the fixing head, by which the initial grip interval was set to 175 mm. Then, setting stroke to 87.5 mm and twist to 440°, twisting and untwisting were reciprocated 10 times for each test specimen at a rate of 40 times per minute. In this case, an A4 size rectangular-shaped test specimen with a width of 210 mm and a length of 297 mm was used.

[Water Vapor Permeability]

For each test specimen, water vapor permeability was measured before and after the Gelbo Flex testing using a water vapor permeability measuring device (PERMA-TRAN-W3/31 manufactured by Mocon). In this case, a measurement method according to JIS K 7129-2: 2019 (infrared sensor method) and ASTM F 1249-90 was used. Furthermore, temperature was set to 40° C., and relative humidity was set to 90%. The unit used for the measurement value of water vapor permeability was set to [g(STP)/m$^2$·day].

[Oxygen Permeability]

For each test specimen, oxygen permeability was measured before and after the Gelbo Flex testing using an oxygen permeability measuring device (OX-TRAN2/20 manufactured by Mocon). In this case, a measurement method according to JIS K 7126-2: 2006 (equal-pressure method) and ASTM D 3985-81 was used. Also, temperature was set to 30° C., and relative humidity was set to 70%. The unit used for the measurement value of oxygen permeability was set to [cm$^3$ (STP)/m$^2$·day. MPa].

[Evaluation Result]

[Softening Temperature]

Table 1 shows softening temperatures in the TD and MD directions measured for the resin films 10 of Examples 1 to 5 and Comparative Example 1.

TABLE 1

|  |  | Ex. 1 | Ex. 2 | Ex. 3 | Ex. 4 | Ex. 5 | Comp. Ex. 1 |
| --- | --- | --- | --- | --- | --- | --- | --- |
| Softening temp. (° C.) | TD Dir. | 253.4 | 249.4 | 241.5 | 241.2 | 249.9 | 257.6 |
|  | MD Dir. | 250.5 | 244.5 | 245.7 | 245.6 | 244.1 | 248.7 |

As shown in Table 1, the softening temperatures in both the TD and MD directions measured for the resin films 10 of Examples 1 to 5 were in the range of 200° C. or more and 254° C. or less. In contrast, while the softening temperature in the MD direction measured for the resin film 10 of Comparative Example 1 was in the range of 200° C. or more and 254° C. or less, the softening temperature in the TD direction was higher than 254° C. and thus was not in the range of 200° C. or more and 254° C. or less.

[Dynamic Elastic Modulus]

Figure 8:
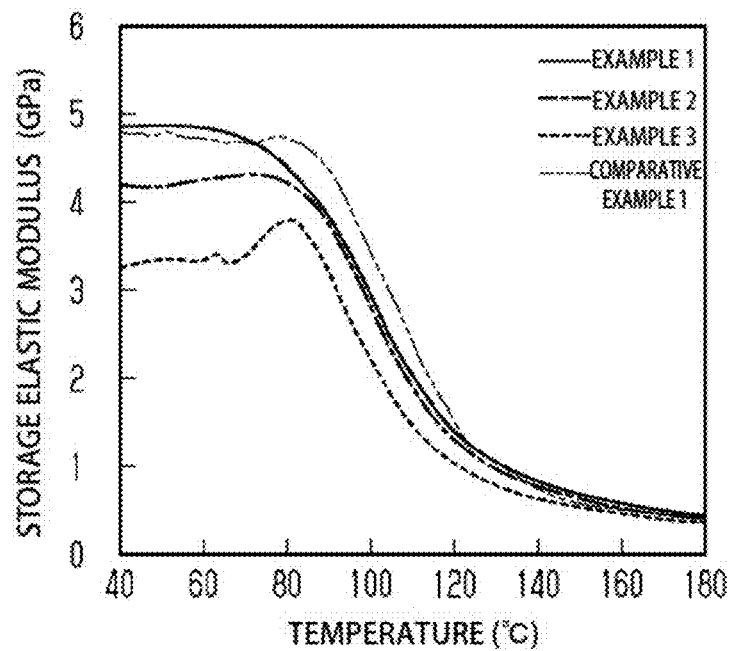
FIG. 8 is a graph showing examples of storage elasticity curves according to examples and a comparative example.
Figure 9:
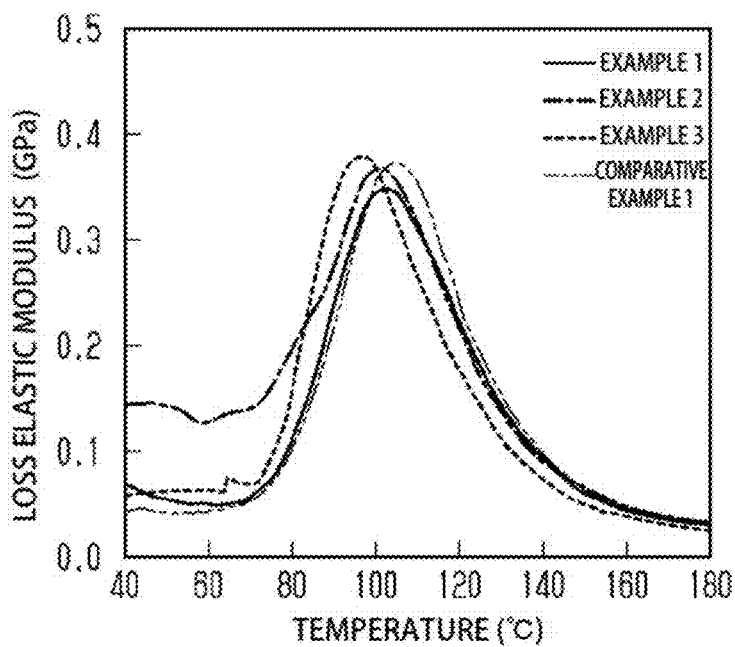
FIG. 9 is a graph showing examples of loss elasticity curves according to examples and a comparative example.
Figure 10:
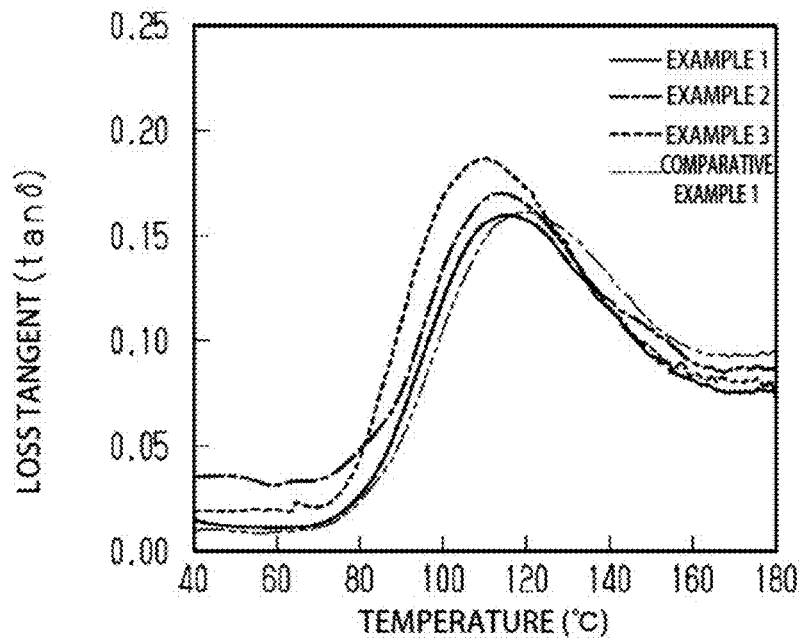
FIG. 10 is a graph showing examples of loss tangent curves according to examples and a comparative example.

FIGS. 8 to 10 each show curves obtained by measuring dynamic elastic moduli for the resin films of Examples 1 to 3 and Comparative Example 1. FIG. 8 shows storage elasticity curves, FIG. 9 shows loss elasticity curves, and FIG. 10 shows loss tangent curves. Dynamic elastic moduli were measured for 3 test specimens of each of Examples 1 to 5 and Comparative Example 1. FIGS. 8 to 10 each show typical curves among the curves obtained by measuring the 3 test specimens.

Table 2 shows analysis results on storage elasticity, loss elasticity, and loss tangent tan δ conducted for the resin films of Examples 1 to 5 and Comparative Example 1. The values in the analysis results are average values obtained by measuring the 3 test specimens.

The analysis results of the storage elasticity are the transition temperature T1 in the storage elasticity curve and the storage elastic modulus G1 at the transition temperature T1. The transition temperature T1 was set to the temperature at the intersection between the approximate straight line of the glass region that was on the lower temperature side than the inflection point and the approximate straight line of the transition region that was on the higher temperature side than the inflection point in the storage elasticity curve. The approximate straight line on the lower temperature side was prepared by approximating a group of the inflection point and measurement points between a point about 10 degrees lower than the inflection point and a point about 5 degrees lower than the inflection point. The approximate straight line on the higher temperature side was prepared by approximating a group of the inflection point and measurement points between a point about 5 degrees higher than the inflection point and a point about 10 degrees higher than the inflection point.

The analysis results of the loss elasticity are the temperature T2 at the peak position in the loss elasticity curve and the loss elastic modulus G2. The analysis results of the loss tangent tan δ are the temperature T3 at the peak position in the loss tangent curve and the loss tangent tan δ.

TABLE 2

|  | Temp. T1 (° C.) | Stg. elastic modulus G1 (GPa) | Temp. T2 (° C.) | Loss elastic modulus G2 (GPa) | Temp. T3 (° C.) | Loss tangent tan δ |
| --- | --- | --- | --- | --- | --- | --- |
| Ex. 1 | 87.6 | 3.8 | 101.3 | 0.34 | 114.8 | 0.162 |
| Ex. 2 | 87.8 | 4.1 | 99.8 | 0.37 | 113.8 | 0.170 |
| Ex. 3 | 80.3 | 3.9 | 95.4 | 0.37 | 108.8 | 0.185 |
| Ex. 4 | 87.3 | 3.8 | 101.0 | 0.34 | 114.5 | 0.163 |
| Ex. 5 | 81.1 | 3.9 | 95.9 | 0.37 | 109.3 | 0.183 |
| Comp. Ex. 1 | 87.0 | 4.7 | 104.7 | 0.39 | 119.0 | 0.157 |

As shown in Table 2, in Examples 1 to 5 containing recycled PET, the transition temperatures T1 in the storage elasticity curves were 80° C. or more and 88° C. or less, and the storage elastic moduli G1 at the transition temperatures T1 were 3.8 GPa or more and 4.1 GPa or less. However, the storage elastic modulus G1 of Comparative Example 1 not containing recycled PET was greater than 4.1 GPa. Specifically, it is implied that the resin film of Comparative Example 1 has stronger elastic properties than the resin films of Examples 1 to 5.

In Examples 1 to 5, the temperatures T2 at the peak positions in the loss elasticity curves were 95° C. or more and 102° C. or less, and the loss elastic moduli G2 at the peak positions were 0.30 GPa or more and 0.37 GPa or less. However, in Comparative Example 1, the temperature T2 was higher than 102° C. Specifically, it is implied that the resin film of Comparative Example 1 is less likely to exhibit flexibility due to viscosity in the low the temperature region. In Comparative Example 1, the loss elastic modulus G2 at the peak position is larger than 0.37 GPa. However, when the difference in storage elastic modulus G1 between Examples 1 to 5 and Comparative Example 1 is compared with the difference in loss elastic modulus G2 between Examples 1 to 5 and Comparative Example 1, it is difficult to say that the viscous properties are prominently stronger due to the difference in loss elastic modulus G2 being small.

In Examples 1 to 5, the temperatures T3 at the peak positions in the loss tangent curves were 108° C. or more and 115° C. or less, and the loss tangents tans δ at the peak positions were 0.160 or more and 0.190 or less. However, in Comparative Example 1, the tan δ at the peak position was smaller than 0.160. Specifically, in Comparative Example 1, the viscous properties were weaker relative to the elastic properties, compared to Examples 1 to 5, which implies that the proportion of viscosity contribution is small in response to external force. Also, since the temperature T3 of Comparative Example 1 is higher than 115° C., it is implied that the resin film of Comparative Example 1 is less likely to exhibit flexibility in the low temperature region.

Figure 11:
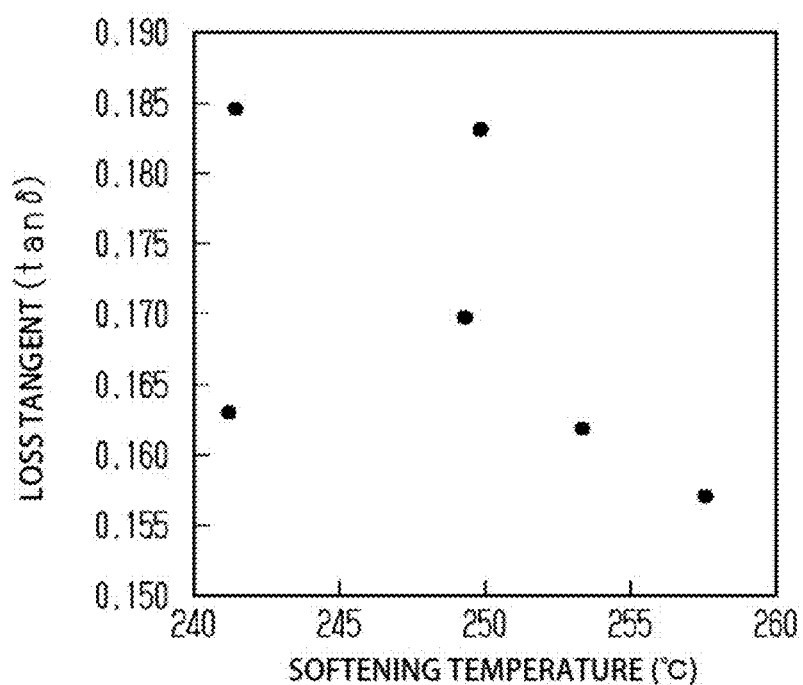
FIG. 11 is a graph showing the relationship between loss tangent and softening temperature according to examples and a comparative example.

FIG. 11 is a graph showing the relationship between the loss tangent tan δ and softening temperature in the TD direction.

As shown in FIG. 11, in the resin films 10 of Examples 1 to 3 and Comparative Example 1, the softening temperature in the TD direction had a negative correlation with the loss tangent tan δ. However, in the resin films 10 of Examples 4 and 5, the softening temperature in the TD direction did not have a correlation with the loss tangent tan δ. From these results, it can be said that the softening temperature in the TD direction does not necessarily have a correlation with the loss tangent δ, and the value of softening temperature can be set independent of the loss tangent δ.

[Barrier Properties]

Table 3 shows oxygen permeability and water vapor permeability of the laminates of Example 6 and Comparative Example 2.

TABLE 3

| | Oxygen permeability (cm³/m² day MPa) | | | | | | Water vapor permeability (g/m² day) | | | | | |
|---|---|---|---|---|---|---|---|---|---|---|---|---|
| | Before testing | | | After testing | | | Before testing | | | After testing | | |
| | N = 1 | N = 2 | Avg. | N = 1 | N = 2 | Avg. | N = 1 | N = 2 | Avg. | N = 1 | N = 2 | Avg. |
| Ex. 6 | 0.7 | 0.6 | 0.7 | 109.9 | 76.2 | 93.1 | 0.06 | 0.09 | 0.07 | 0.54 | 1.40 | 0.97 |
| Comp. Ex. 2 | 0.6 | — | 0.6 | 167.1 | 138.3 | 152.7 | 0.19 | — | 0.19 | 2.30 | 1.30 | 1.80 |

As shown in Table 3, the average value of oxygen permeability after the Gelbo Flex testing in Example 6 was smaller than the average value after the Gelbo Flex testing in Comparative Example 2. Also, the amount of change before and after the Gelbo Flex testing was smaller in Example 6 than in Comparative Example 2. Also, the average value of water vapor permeability after the Gelbo Flex testing in Example 6 was smaller than the average value after the Gelbo Flex testing in Comparative Example 2. Also, the amount of change before and after the Gelbo Flex testing was smaller in Example 6 than in Comparative Example 2.

Thus, according to Example 6, it can be said that resistance to pinholes due to vibration during transportation, etc. was increased as simulated by the Gelbo Flex testing, thereby preventing increase in oxygen permeability and water vapor permeability, or, in other words, thereby preventing deterioration in gas barrier properties. Specifically, it can be said that, if softening temperatures in both the TD and MD directions are in the range of 200° C. or more and 254° C. or less, softness of the resin film 10 is maintained within an appropriate range to thereby prevent deterioration in gas barrier properties of the laminate 20 due to external force.

It was also confirmed that, in the laminates including any one of the resin films 10 of Examples 2 to 5, gas barrier properties were prevented from being deteriorated as in the laminate of Example 6, unlike the laminate of Comparative Example 2.

As described above, according to the embodiments of the resin film, laminate, and packaging body, the effects described below can be achieved.

(1) Even when an external force is applied to the gas barrier layer 11, the applied external force is easily mitigated by the resin film 10, and therefore buckling is less likely to occur in the gas barrier layer 11. Therefore, even when an external force is applied to the laminate 20 including the resin film 10 and gas barrier layer 11, separation is less likely to occur between the resin film 10 and the gas barrier layer 11. For this reason, even when application and release of external force are repeated on the packaging body 30 formed of the laminate 20 such as when the packaging body 30 is transported, defects, which would be caused by separation, are less likely to occur in the gas barrier layer 11.

(2) According to the resin film 10 satisfying Condition 4, the magnitude of the viscous properties becomes suitable in the resin film 10 relative to the elastic properties, and therefore flexibility is enhanced. Specifically, in the resin film 10, the proportion of viscosity contribution relative to elasticity contribution in response to external force becomes sufficiently high and thus vibration absorbability is enhanced. Accordingly, even when external force is repeatedly applied to the laminate 20, the gas barrier layer 11 laminated on the resin film 10 is prevented from moving, to thereby prevent occurrence of defects in the gas barrier layer 11. Therefore, deterioration in gas barrier properties of the laminate 20 can be prevented. Also, the viscous properties of the resin film 10 do not become excessively strong relative to the elastic properties, and therefore deterioration in suitability of the laminate 20 as a packaging material is prevented.

(3) If the temperature T3 at the peak position in the loss tangent curve of the resin film 10 is 108° C. or more and 115° C. or less, the temperature T3 at the peak position is not excessively high, and therefore flexibility of the resin film 10 due to viscosity is likely to be favorably exhibited in the environments where the packaging body 30 is used.

(4) According to the resin film 10 satisfying Condition 2, strength of the elastic properties of the resin film 10 becomes suitable in the environments where the packaging body 30 is used. Specifically, elasticity contribution in response to external force does not become excessively large in the resin film 10, and therefore deterioration in gas barrier properties of the laminate 20 is prevented. On the other hand, the elastic properties of the resin film 10 do not become excessively weak, and therefore suitability of the laminate 20 as a packaging material is easily prevented from being deteriorated.

(5) According to the resin film 10 satisfying Condition 3, flexibility of the resin film 10 due to viscosity is likely to be favorably exhibited in the low temperature region including the temperatures in the environments where the packaging body 30 is used. Therefore, deterioration in gas barrier properties of the laminate 20 is prevented. Also, the viscous properties of the resin film 10 do not become excessively strong, and therefore suitability of the laminate 20 as a packaging material is easily prevented from being deteriorated.

(6) Since the resin film 10 contains polyethylene terephthalate containing terephthalic acid and isophthalic acid, a resin film satisfying Condition 1 can be obtained.

(7) Since the gas barrier layer 11 includes a first barrier layer and a second barrier layer, barrier properties of the laminate 20 can be enhanced.

(8) Since the first barrier layer is in contact with the resin film 10, and the second barrier layer is in contact with the first barrier layer, the resin film 10 can be protected by the first barrier layer, the first barrier layer can be protected by the second barrier layer, and gas barrier properties of the first barrier layer can be supplemented by the second barrier layer.

(9) Since the second barrier layer contains a silicon compound expressed by $Si(OR^1)_4$ or $R^2Si(OR^3)_3$, or one or more hydrolysates of the silicon compound, and a water-soluble polymer with hydroxyl group, the second barrier layer can exert strong effects of protecting the first barrier layer and supplementing gas barrier properties of the first barrier layer.

(10) According to the packaging body 30 formed from the laminate 20, gas barrier properties can be prevented from being deteriorated due to vibration, etc. applied to the packaging body 30 when it is transported as a commercial product. This can prevent quality deterioration of an object packaged by the packaging body 30.

REFERENCE SIGNS LIST

10 . . . Resin film; 11 . . . Gas barrier layer; 20 . . . Laminate; 30 Packaging body.

What is claimed is:

1. A resin film having laminated thereon a gas barrier layer having gas barrier properties to constitute a laminate for a packaging body, comprising
polyethylene terephthalate, wherein
in a cross section of the resin film, a softening temperature of the resin film in a width direction and a softening temperature of the resin film in a flow direction measured by local thermal analysis are in a range of 200° C. or more and 254° C. or less.

2. The resin film of claim 1, wherein
in a loss tangent curve indicating a relationship between loss tangent tan δ of the resin film and temperature, a loss tangent tan δ at a peak position is 0.160 or more and 0.190 or less.

3. The resin film of claim 2, wherein
temperature at a peak position in the loss tangent curve is 108° C. or more and 115° C. or less.

4. The resin film of claim 1, wherein
in a loss elasticity curve indicating a relationship between loss elastic modulus of the resin film and temperature, temperature at a peak position is 95° C. or more and 102° C. or less, and a loss elastic modulus at the peak position is 0.30 GPa or more and 0.37 GPa or less.

5. The resin film of claim 1, wherein
in a storage elasticity curve indicating a relationship between storage elastic modulus of the resin film and temperature, transition temperature from a glass state to a rubber state is 80° C. or more and 88° C. or less, and a storage elastic modulus at the transition temperature is 3.8 GPa or more and 4.1 GPa or less.

6. The resin film of claim 1, wherein
the resin film contains polyethylene terephthalate in dicarboxylic acid units in repeating units, the polyethylene terephthalate containing terephthalic acid and isophthalic acid.

7. A laminate, comprising
the resin film according to claim 1; and
a gas barrier layer having gas barrier properties.

8. The laminate of claim 7, wherein the gas barrier layer comprises
a first barrier layer containing at least one of aluminum oxide and silicon oxide; and
a second barrier layer containing a polymer compound.

9. The laminate of claim 8, wherein
the first barrier layer is in contact with the resin film; and
the second barrier layer is in contact with the first barrier layer.

10. The laminate of claim 8, wherein
the second barrier layer contains a silicon compound expressed by $Si(OR^1)_4$ or $R^2Si(OR^3)_3$ ($OR^1$ and $OR^3$ representing hydrolyzable groups, and $R^2$ representing an organic functional group), or one or more hydrolysates of the silicon compound, and a water-soluble polymer with hydroxyl group.

11. A packaging body for packaging an object, comprising the laminate of claim 7.

* * * * *